Dec. 10, 1968
J. D. O'BANION
3,415,397
VEHICLE TOWING DEVICE
Filed March 21, 1966
2 Sheets-Sheet 1
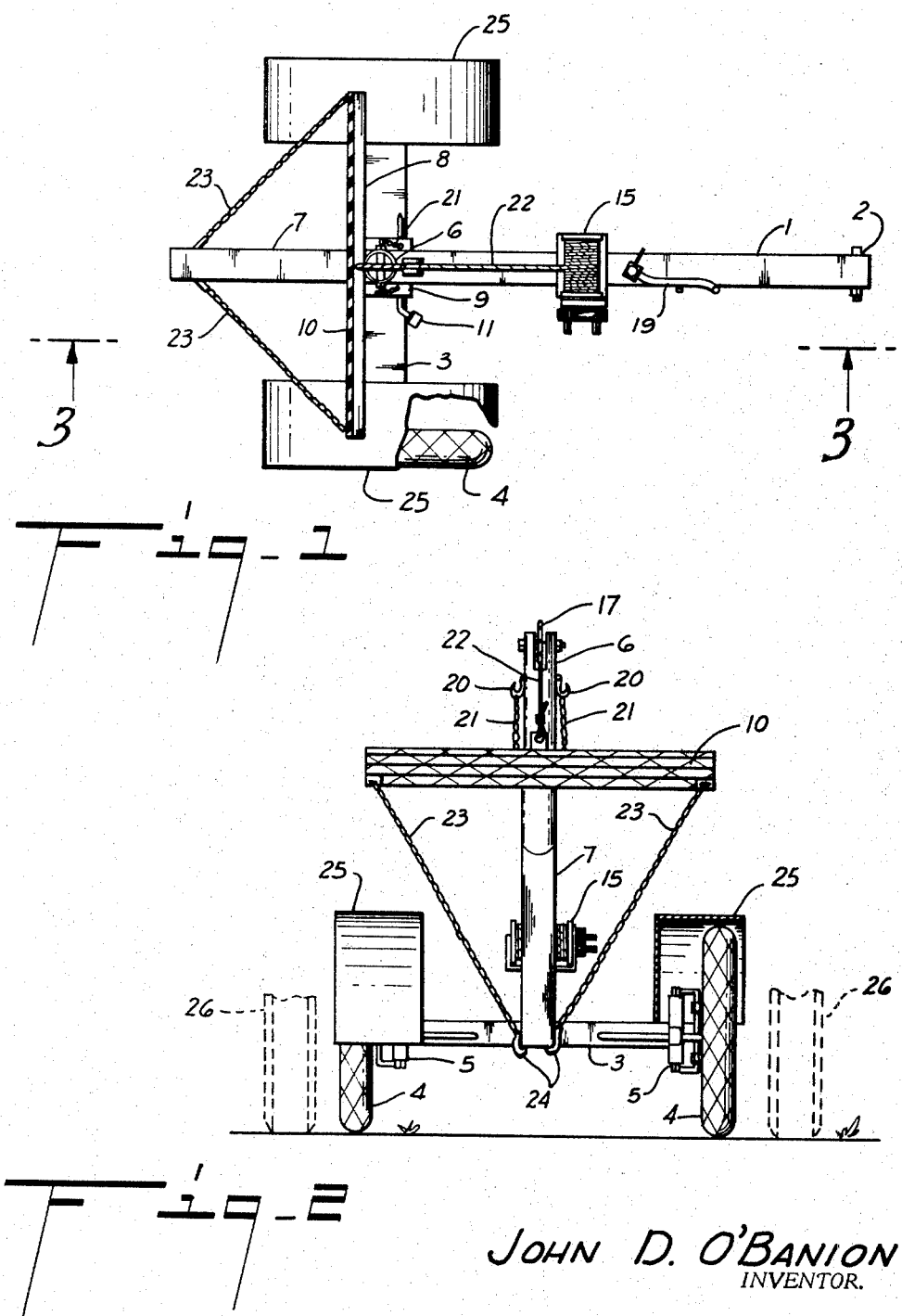
JOHN D. O'BANION
INVENTOR.
BY *[signature]*
ATTORNEY Dec. 10, 1968  J. D. O'BANION  3,415,397
VEHICLE TOWING DEVICE
Filed March 21, 1966  2 Sheets-Sheet 2

JOHN D. O'BANION
INVENTOR.

BY
ATTORNEY

United States Patent Office 3,415,397
Patented Dec. 10, 1968

3,415,397
VEHICLE TOWING DEVICE
John D. O'Banion, Corpus Christi, Tex., assignor of thirty percent each to Paul Bardwell and Gene Crane, and ten percent to Harmon Dobson, all of Neuces County, Tex.
Filed Mar. 21, 1966, Ser. No. 535,804
3 Claims. (Cl. 214—86)

ABSTRACT OF THE DISCLOSURE

A vehicle towing device to be towed by another vehicle, having a framework, comprising an elongated tongue and a transverse axle adjacent one end thereof, a pair of wheels rotatably mounted on said axle and an upstanding support mounted over the axle and on said tongue, a tow bar supported on said upstanding support by means of a cable mounted over a pulley in the extended end of said support and an inclined support extending from said upstanding support adapted to receive and support the bumper of a vehicle to be towed.

---

This invention relates to new and useful improvements in a car towing device.

It is an object of this invention to provide a device for towing automobiles which may be hitched to the rear of another vehicle, and the towing thus safely and easily performed.

It is another object of the invention to provide a towing device that may be attached to the rear of a towing vehicle and a towed vehicle mounted thereon by sliding one end thereof onto the device, and maintaining the thrust occasioned thereby in a vertical position.

It is another object of the invention to provide a device for towing vehicles that may be hitched to one end of a pulling vehicle and which has means for manually sliding one end of the vehicle to be towed into towing position on said device and locking same in towing position.

With the above and other objects in view, the invention has relation to certain novel features of construction, operation and arrangement of parts more particularly defined in the following specifications and illustrated in the accompanying drawings, wherein:

FIGURE 1 is a top plan view of the device.

FIGURE 2 is a rear elevational view, showing the wheels of the towed vehicle in dotted lines.

Figure 3:
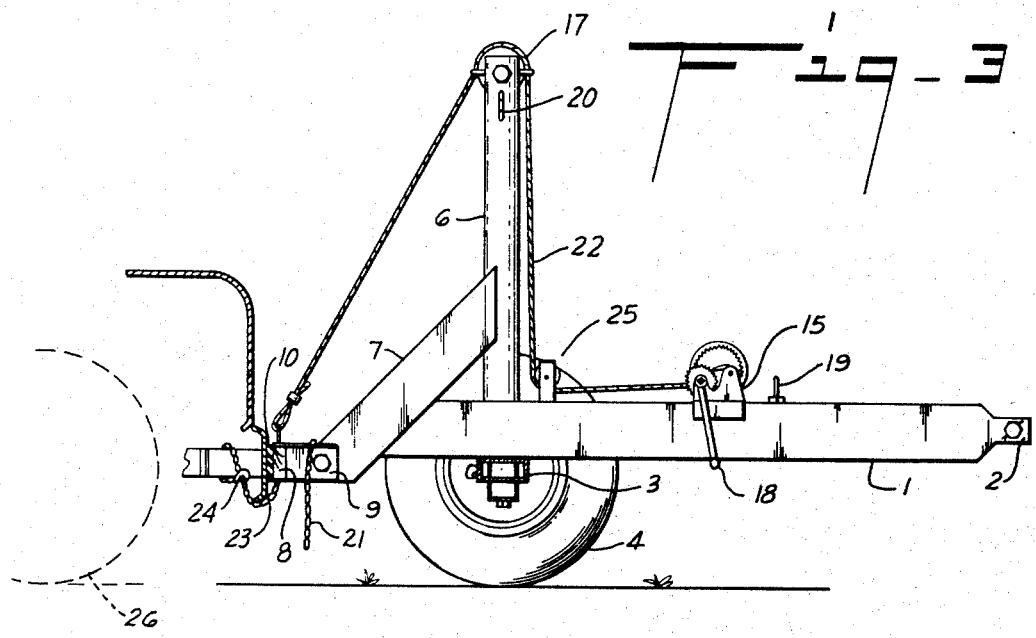
FIGURE 3 is a side elevational view of the device showing the wheels of the vehicle to be towed in dotted lines and showing the bumper of the vehicle to be towed secured to the transverse bar preparatory to raising said vehicle into towing position.
Figure 3A:
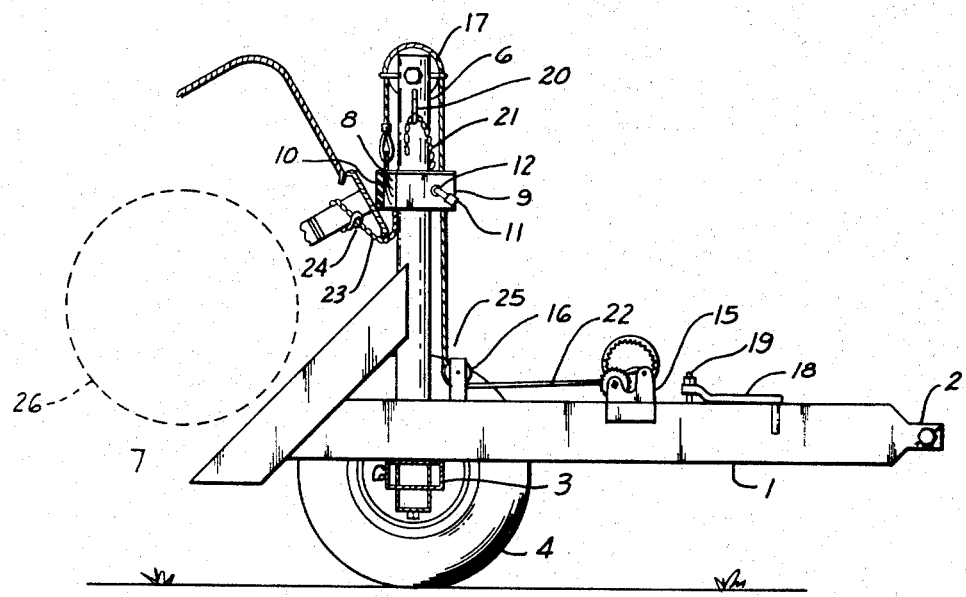
FIGURE 3A shows the same view as FIGURE 3, showing the vehicle to be towed in a towing position on the towing device.

Referring now more particularly to the drawings, the numeral 1 designates a tongue having a suitable hitching device 2 at one end and a transverse axle 3 adjacent the other end. Wheels 4, 4 are mounted on the axle 3 and are provided with suitable tie rod assemblies as 5, 5. The wheel base of the device is intended to be of less width than the normal wheel base of the average passenger vehicle.

Integral with and extending upwardly from the axle 3 is the tubular mast 6. A box like slide 7 is anchored to the mast 6 and the tongue 1 and extends at an angle downwardly and rearwardly from the mast 6.

A tow bar 8 is loosely mounted on the mast 6 by means of the bracket 9. A rubber facing 10 is mounted on the bar 8 to protect the bumper of the vehicle to be towed.

The bracket 9 may be locked in position on the mast 6 by passing the shaft of a lug wrench, or the like, as 11, through the ports 12, 12 in the bracket 9 and securing same therein.

A suitable winch as 15 is mounted on the tongue 1 and a cable 22 extends therefrom through the pulley 16 and over the sheave 17 mounted on the extended end of the mast 6, and is secured to the bar 8, to suspend the bar 8 from the mast 6. A detachable handle 18 is provided to manually actuate the winch 15, and which may be stored on the pin 19 on the tongue 1 when not in use.

Hooks 20, 20 are provided on each side of the mast 6 adjacent the extended end thereof. Safety chains 21, 21, mounted on the bar 8, may be secured to the hooks 20, 20 when the bar 8 is in raised position. Chains 23, 23 extend from the respective ends of the bar 8 and have hooks 24, 24 on the free ends thereof, for securing the vehicle to be towed to the bar 8. Suitable fenders 25, 25 are provided to cover the wheels 4, 4.

In operation, the tongue is attached at 2 to a towing vehicle, in the usual manner of attaching a trailer, and the bar 8 will be in raised position as shown in FIGURE 2, with the lug wrench 11 mounted in the bracket 9 to the safety chains 21, 21 secured to the hooks 20, 20 and the chains 23, 23 secured by engaging the hooks 24, 24 to the lower end of the mast 6. When it is desired to tow another vehicle, such as shown in dotted lines as 25, the chains 21, 21 are removed from the hooks 20, 20, the lug wrench 11 disengaged from the bracket 9 and the bar 8 lowered. As the bar 8 is lowered, the bracket 9 will embrace the slide 7, and slide downwardly on said slide 7. The bar 8 is then moved into abutting position with the bumper of the vehicle to be towed and the chains 23, 23 secured to the bumper supports, or the framework, of the vehicle to be towed, and the slack in the cable 22 removed by means of the winch 15, and as the winch 15 is actuated, the bracket 9 is again positioned on the slide 7 and the vehicle to be towed is raised into towing position, the bracket 9 sliding along the slide 7 and then up the mast 6 until the bar 8 is adjacent the top of the mast 6, when the lug wrench 11, or the like, is inserted into these ports to lock the bracket 9 in rotatable position on the mast 6 and the chains 21, 21 are secured to the hooks 20, 20 to maintain the bar 8 in elevated position on the mast. The cable 22 being parallel to the mast 6, and the car to be towed, by sliding upwardly on the slide 7, will assert its weight on the mast 6, and after in suspended position on the mast 6 will continue to assert its weight vertically on the mast 6, so that the tongue 1 may be readily manipulated, even when in fully loaded relation, in securing the vehicle to the drawing vehicle. The bar 8 may rotate on the mast 6, limited only by the supporting chains 21, 21, so that the vehicle being towed will readily follow the towing vehicle in making turns.

While the foregoing is considered a preferred form of the invention, it is by way of illustration only, the broad principle of the invention being defined by the appended claims.

What I claim is:

1. In a towing device, an elongated tongue having a transverse axle adjacent one end and a hitching means at the other end, wheels mounted on said axle, a vertical mast mounted on said tongue over said axle, a slide bar extending from said mast downwardly and rearwardly of said tongue, a winch mounted on said tongue having a cable, rotating means on the upper end of said mast over which said cable extends, a transverse bar suspended by said cable, means on said transverse bar for guiding said transverse bar on said mast and said sliding bar, means on said transverse bar for securing the bumper of a vehicle to be towed thereto and means on said tongue for maintaining said cable in parallel position on said mast to provide a vertical thrust over said axle on said mast when moving a vehicle into towing position.

2. The device defined in claim 1 wherein means are provided on said mast to lock said transverse bar in raised position.

3. In a towing device, an elongated tongue having a transverse axle adjacent one end and a hitching means at the other end, wheels mounted on said axle, a vertical mast mounted on said tongue over said axle, a slide bar extending from said mast downwardly and rearwardly of said tongue, a winch mounted on said tongue having a cable, rotating means on the upper end of said mast over which said cable extends, a transverse bar suspended by said cable, means on said transverse bar for guiding said transverse bar on said mast and said sliding bar, and means on said transverse bar for securing the bumper of a vehicle to be towed thereto, wherein said mast is provided with hooks adjacent the upper end thereof and said transverse bar is provided with chains having one end anchored to said bracket and the other end of said chains being adapted to be received by said hooks to lock said transverse bar in raised position.

References Cited
UNITED STATES PATENTS

| | | | |
|---|---|---|---|
| 1,517,547 | 12/1924 | Ekberg | 214—86 |
| 2,808,160 | 10/1957 | La Londe | 214—86 |
| 3,127,037 | 3/1964 | Newman | 214—86 |
| 3,152,704 | 10/1964 | Russell | 214—86 |
| 3,322,396 | 5/1967 | Hubbard | 214—86 |

ALBERT J. MAKAY, *Primary Examiner.*